(12) United States Patent
de Silva et al.

(10) Patent No.: US 7,383,125 B2
(45) Date of Patent: Jun. 3, 2008

(54) NAVIGATION METHOD AND SYSTEM FOR ACCURATELY ESTIMATING POSITIONS OF STREET ADDRESS NUMBERS

(75) Inventors: Andrew S. de Silva, Torrance, CA (US); Joey Pascual, Torrance, CA (US); Tatsuo Yokota, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 181 days.

(21) Appl. No.: 11/129,878

(22) Filed: May 16, 2005

(65) Prior Publication Data

US 2006/0259237 A1    Nov. 16, 2006

(51) Int. Cl.
  *G01C 21/00*   (2006.01)
(52) U.S. Cl. .................................. 701/209; 340/995.12
(58) Field of Classification Search ............... 701/208, 701/209, 210, 213, 211, 212; 340/995.1, 340/995.12, 995.14, 995.15, 995.16, 995.23, 340/995.27
  See application file for complete search history.

(56) References Cited

U.S. PATENT DOCUMENTS

| 5,107,433 | A | | 4/1992 | Helldorfer et al. | |
|---|---|---|---|---|---|
| 5,359,527 | A | * | 10/1994 | Takanabe et al. | 701/209 |
| 5,471,392 | A | * | 11/1995 | Yamashita | 701/200 |
| 6,115,669 | A | * | 9/2000 | Watanabe et al. | 701/209 |
| 6,859,723 | B2 | * | 2/2005 | Yokota | 701/201 |
| 7,092,957 | B2 | * | 8/2006 | Klein | 707/102 |
| 7,164,988 | B2 | * | 1/2007 | Kato | 701/209 |
| 2004/0030490 | A1 | * | 2/2004 | Hegedus et al. | 701/200 |

* cited by examiner

*Primary Examiner*—Dalena Tran
(74) *Attorney, Agent, or Firm*—Muramatsu & Associates

(57) ABSTRACT

A navigation method and system determines a more accurate position of a street address number with use of building footprint information or latitude/longitude information of POI (point of interest), thereby accurately defining a position of a destination. When a user specifies a street address number as his destination, the navigation system retrieves the street segment that should include the location of the specified address number therein. The navigation system also checks the map data as to whether there is any building footprint data or POI position data associated with the street segment. The navigation system selects absolute locations on the street segment based on the building footprint data or the POI position data and determines the location of the specified address number by interpolating between two absolute locations.

18 Claims, 11 Drawing Sheets

NAVIGATION METHOD AND SYSTEM FOR ACCURATELY ESTIMATING POSITIONS OF STREET ADDRESS NUMBERS

FIELD OF THE INVENTION

This invention relates to a navigation method and system, and more particularly, to a navigation method and system that determines a more accurate position of a particular street address number derived from a map database with use of building footprint information or latitude/longitude information of POI (point of interest), thereby accurately defining a position of a destination.

BACKGROUND OF THE INVENTION

A navigation system performs travel guidance for enabling a user to easily and quickly reach the selected destination. A typical example is a vehicle navigation system where a vehicle carries a navigation function. Such a navigation system detects the position of the user or user's vehicle, and reads out map data pertaining to an area at the current vehicle position from a data storage medium in the navigation system. The navigation system displays a map image on a monitor screen while superimposing a mark representing the current location of the user on the map image. When a destination is set, the navigation system starts a route guidance function for setting a guided route from the start point to the destination and guides the user to the destination.

FIGS. 1A-1H show an example of overall procedure and screen display involved in the navigation system. FIG. 1A shows an example of locator map screen of the navigation system typically used when the destination is not specified. The navigation system displays a street on which the vehicle (current vehicle position VP) is running on a map image and a name of the street. Other information such as a north pointer NP, a map scale and a current time may also be illustrated on the display screen.

FIGS. 1B-1F show an example of process for specifying a destination in the navigation system. When selecting a "Destination" menu on a main menu screen of FIG. 1B, the navigation system displays an "Find Destination By" screen as shown in FIG. 1C for specifying an input method for selecting the destination. The "Find Destination By" screen lists various methods for selecting the destination. This example includes the methods of "Address", "Intersection", "Point of Interest", "Recent Route", "Address Book", and "Today's Plan" which are well known in the art.

When selecting, for example, the "Address" method in FIG. 1C, the navigation system displays a keyboard screen in FIG. 1D. Suppose the user inputs an address "2525 W. Carson" of a "Del Amo" shopping mall, the navigation system displays a "Confirm Destination" screen such as shown in FIG. 1E. If the name and address on the screen shows the correct destination, the user enters an "OK to Proceed" key to proceed to the next procedure.

In FIG. 1F, the navigation system calculates and determines a route to the destination, i.e., the address "2525 W. Carson". The navigation system determines a route to the destination based on, for example, the quickest way to reach the destination, the route using many free ways as possible or the route without using toll road, and the like. In this example, the navigation system displays a progress scale of the calculation of the route.

Once the route to the destination is determined, the navigation system starts the route guidance as shown in FIG. 1G for guiding the user to the destination. Typically, the navigation system shows the intersection which is highlighted to show the next turn and a direction of the turn. Such route guidance by the navigation system is also accompanied by voice instructions. By approaching every intersection to turn, the navigation system automatically displays the intersection guidance diagram to instruct the user which direction to turn at the intersection.

The navigation system measures a distance to the current destination to detect whether the destination is within a predetermined range such as within 100 meters. When the user approaches the destination within such a predetermined distance, the navigation system indicates that the destination "Dest" is ahead as shown in FIG. 1H. The navigation system detects the actual arrival based on various factors such as the engine stop.

In the foregoing process, the point which the navigation system indicates as the destination may not exactly be an actual position of the destination intended by the user. For example, in the conventional navigation system, the position of the destination calculated by the system sometimes does not match the actual position of the street address. This is because the map information usually shows only the address number and absolute position of each end of a street segment. Thus, the map data does not always include an accurate position of street address for each and every address number on the street.

Such a situation is shown in FIGS. 2A-2C. FIG. 2A shows the address distribution on a street segment of a particular street "2525 Carson W. Street" in FIGS. 1A-1H which is assumed by the navigation system. FIG. 2B shows an example of actual address distribution on the street segment of FIG. 2A. For example, as shown in FIG. 2A, the map data provides the street address number and its position of each end of a street segment. Thus, although the address number and position at each end (1000 and 4000) of the street segment are accurate, positions of intermediate addresses are not always accurate. This is because they are spread evenly by the navigation system, i.e., with a constant interval, along the street between the lowest address number and the highest number of the street segment. Thus, the address number "2525 Carson W. Street" in FIGS. 1A-1H is assumed to be at the location shown in FIG. 2A.

However, since the actual address numbers are assigned irregularly as shown in FIG. 2B, the actual position (arrival position) of the destination is different from the position of FIG. 2A by a distance d. Therefore, a user may be confused when the navigation system announces the arrival at the incorrect position on the street. FIG. 2C shows another example of actual address distribution where address numbers on the street in a residential area is proportionally assigned with relatively small interval while the address numbers on the street in a park, field or vacant land are assigned unevenly, i.e., by an irregular interval with relatively large interval.

Therefore, there is a need of a new navigation method system which is able to improve the performance in interpreting an address number of a destination based on the other information contained in the map database so that the actual position of the destination can be determined more accurately.

SUMMARY OF THE INVENTION

It is, therefore, an object of the present invention to provide a navigation system that improves accuracy in determining the location of a target address.

It is another object of the present invention to provide a navigation method and apparatus which is able to use building footprint information in combination with street segment data for more accurately defining a position of a destination.

It is a further object of the present invention to provide a navigation method and apparatus which is able to use latitude/longitude information of POI (point of interest) in the map data in combination with street segment data to more accurately defining a position of a destination.

It is a further object of the present invention to provide a navigation method and apparatus which is able to use both building footprint information and latitude/longitude information of POI (point of interest) in the map data in combination with street segment data to more accurately defining a position of a destination.

One aspect of the present invention is a navigation method for determining a position of a street address number. The method is comprised of the steps of: receiving a street address number of a destination specified by a user; retrieving data indicating a street segment which includes the specified street address number thereon from a map information storage; searching for supplemental data regarding a place associated with the retrieved street segment including information indicating absolute position of the place and retrieving the supplemental data from the map information storage; defining two or more absolute positions on the street segment with use of the supplemental data and the street segment data; selecting two absolute positions on the street segment that have the specified address number therebetween; and determining a position of the specified address number by interpolating a length between the two selected absolute positions with a constant interval.

The supplemental data is polygonal data of the place on the street segment which includes latitude/longitude information indicating a shape, size and location of the place. Preferably, the supplemental data is footprint data of a building on the street segment which includes latitude/longitude information indicating a shape, size and location of the building. Alternatively, the supplemental data is position data of POI (point of interest) on the street segment which includes latitude/longitude information indicating an absolute position of the POI.

The step of defining two or more absolute positions on the street segment includes a step of drawing a line perpendicular to the street segment from a selected point of the place showing the absolute position on the place. The selected point is a point on the building showing the absolute position on the building when the building footprint data is used. The selected point is a point indicating the position of POI when the latitude/longitude data of the POI is used.

The step of determining the position of the specified address number includes a step of storing the information regarding the determined position of the specified address number for future use. Further, the step of determining the position of the specified address number includes a step of determining positions corresponding to other address numbers on the street segment by interpolating a length between the two selected absolute positions with a constant interval and storing the information regarding the determined positions for future use.

Another aspect of the present invention is a navigation system for implementing the various steps of the navigation method noted above. The navigation system is designed to determine accurate locations corresponding to street address numbers with use of polygon data such as building footprint data and/or POI position (latitude/longitude) data in combination with street segment data.

According to the present invention, the navigation method and system improve accuracy in determining the location of the target address. The navigation method and system of the present invention is able to use building footprint information in combination with street segment data to accurately determining a position of an street address number. Further, the navigation method and system of the present invention is able to use latitude/longitude information of POI (point of interest) in the map data in combination with the street segment data to accurately determining a location of a street address number. Further, the navigation method and system of the present invention is able to use both the building footprint information and the latitude/longitude information of POI (point of interest) in the map data in combination with the street segment data to accurately define a position of a selected destination.

BRIEF DESCRIPTION OF THE DRAWINGS

FIG. 7A shows a case where building footprint information is not used for allocating address locations on a particular street, and FIG. 7B shows a case where the building footprint information is used for allocating address locations on the particular street.

FIG. 9A shows a case where latitude/longitude information of POIs is not used for allocating address locations on a particular street, and FIG. 9B shows a case where the latitude/longitude information of POIs is used for allocating address locations on the particular street.

DETAILED DESCRIPTION OF THE INVENTION

Figure 1A:
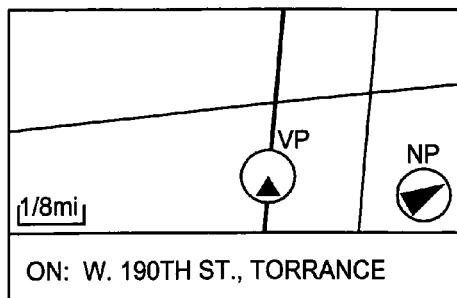
FIGS. 1A-1H are schematic diagrams showing an example of process and screen display of a navigation system for specifying a destination, determining a route to the destination, and guiding a user to the destination.
Figure 1B:
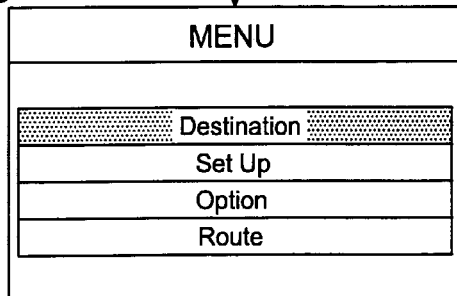
Figure 1C:
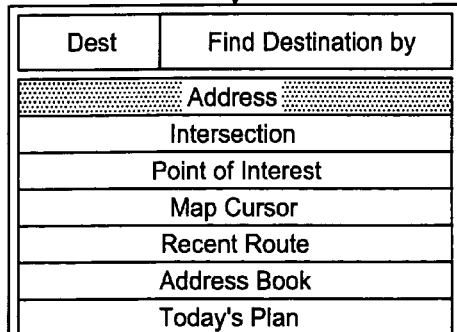
Figure 1D:
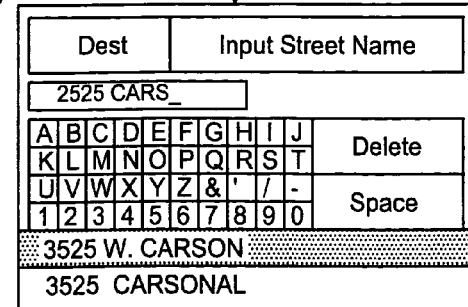
Figure 1E:
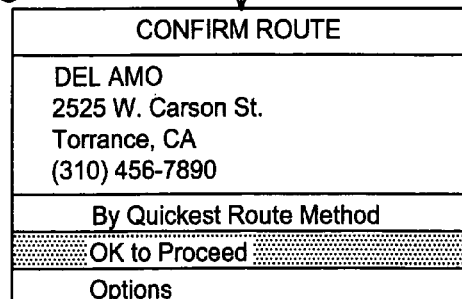
Figure 1F:
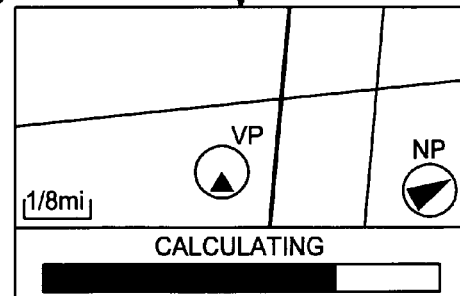
Figure 1G:
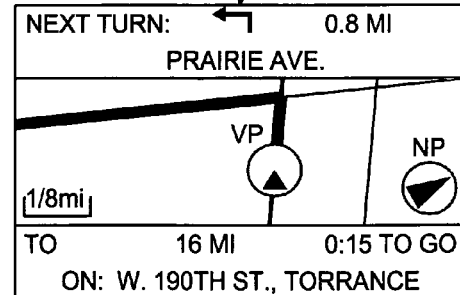
Figure 1H:
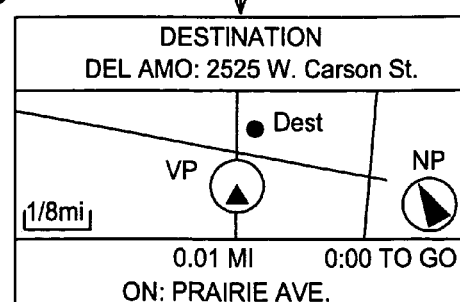

The present invention will be described in detail with reference to the accompanying drawings. The navigation system of the present invention is designed to accurately determine an actual position of a street address number with use of polygon data of a large facility, such as building footprint information retrieved from the map data. The navigation system of the present invention is also designed to accurately determine an actual position of a street address number with use of latitude/longitude information of POI (point of interest) retrieved from the map data.

Generally, the map database for a navigation system is available in the market through a map data provider. In addition to basic map data, the recent map database includes geographic polygon data for relatively large structures such as shopping malls, stadiums, universities, etc., and POI position data defined by latitude/longitude information. Further, building footprint information are also beginning to be provided as polygon data in the map database even though such buildings are not especially large. The polygonal data has the advantage of allowing a boundary of a particular structure to be specified in a two dimensional manner, thereby defining the shape and size of the structure by connecting a plurality of points such as corners on the polygon. Each of such points for illustrating the polygon on the map image is defined by latitude/longitude data, i.e., an absolute position.

In order to make full use of the polygon data such as building footprint data, the navigation system detects whether there is any building or other large structure on a particular street segment. For example, if a user specifies a street address number as his destination, the navigation system retrieves the street segment that should include the location of the specified address number therein. The navigation system also checks the map data as to whether there is any polygon data associated with the street segment, i.e., whether there is any large structure or buildings accompanied by polygon (footprint) data. Similarly, the navigation system also checks the map data as to whether there is any POI on the street segment including position (latitude/longitude) information of POI.

As noted above, each end of a street segment is defined by its absolute position (latitude/longitude) and an address number. If polygon data such as building footprint data is associated with the street segment, by combining the absolute locations of the points on the building footprint with the absolute locations of the ends of the street segment, the location of the specified address number can be more accurately determined by interpolating between two adjacent absolute locations. Similarly, if POI position data is associated with the street segment, by combining the absolute locations of the POIs with the absolute locations of the ends of the street segment, the location of the specified address number can be accurately determined by the interpolation. Thus, the navigation system is able to accurately guide the user to the destination and stores the relationship between the street address number and the actual position on the street for use in the next travel.

Figure 3:
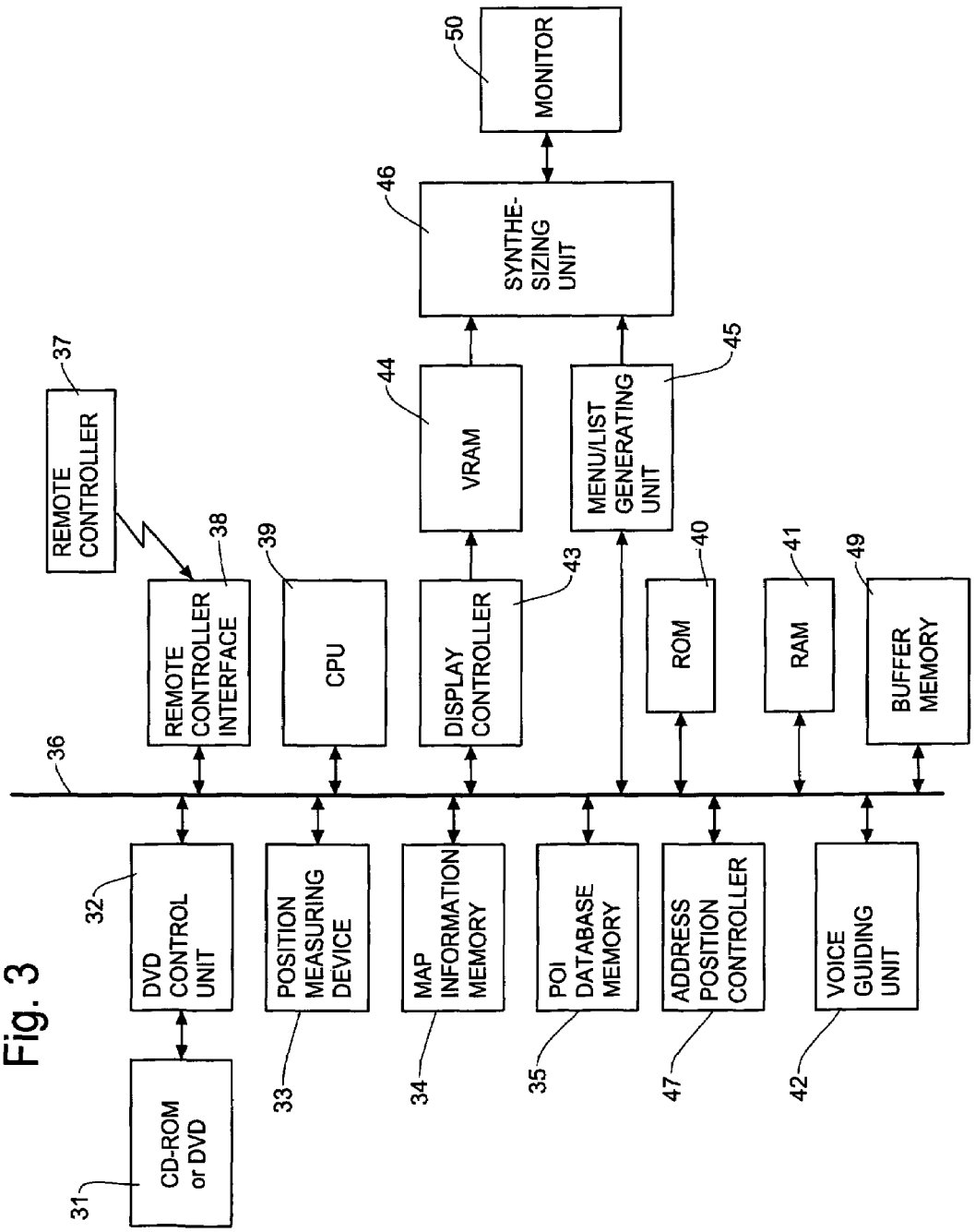
FIG. 3 is a block diagram showing an example of structure of a vehicle navigation system implementing the present invention for accurately determining a location of a street address number.

FIG. 3 shows a structure of a vehicle navigation system for implementing the present invention. While the vehicle navigation system is explained for an illustration purpose, the present invention can also be applied to other types of navigation system. For example, the present invention can be applied to a portable navigation device implemented by a PDA (personal digital assistant) device, other hand-held devices such as a wireless telephone, or a laptop computer.

In the block diagram, the navigation system includes a map storage medium 31 such as a CD-ROM, DVD, hard disc or other storage means (Hereafter "DVD") for storing map information. Alternatively, such map data can be provided to the user from a remote server through a communication network such as Internet. The navigation system includes a DVD control unit 32 for a controlling an operation for reading the map information from the DVD, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (Global Positioning System) receiver, and etc.

The block diagram of FIG. 3 further includes a map information memory 34 for storing the map information which is read from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

Although a remote controller is a typical example for selecting menus, executing selected functions and etc., the navigation system includes various other input methods to achieve the same and similar operations done through the remote controller. For example, the navigation system includes hard keys and a joystick on a head unit of the navigation system mounted on a dash board, touch screen of the display panel, and voice communication means.

In FIG. 3, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a voice interface and guiding unit 42 for voice communication interface and spoken instructions, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, and a monitor (display) 50.

An address position controller 47 and a buffer memory 49 perform a function of the present invention for correcting a relationship between an address number on a street and an actual position of the destination. The address position controller 47 reads out the address position data from the map information memory 34 to compute the position of the destination. By learning the actual location of the destination and updating the location indicated by the address number to the actual location of the destination, the navigation system records the updated address data in the buffer memory 49. Thus, the navigation method and system is able to more accurately determine the position of the destination defined by the street address number so that it can accurately guide the user to the destination. The navigation system stores the position information for use in the next travel to the same destination or other destination on the same street.

Figure 4:
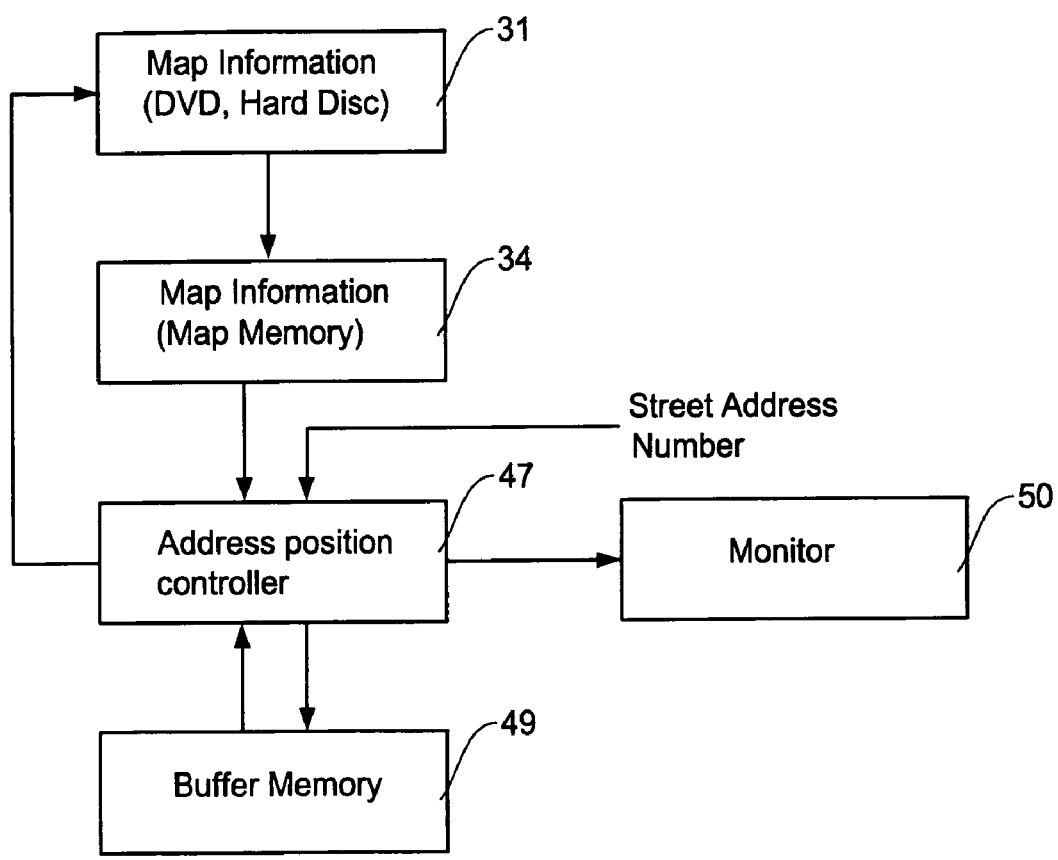
FIG. 4 is a block diagram showing an essential part of the navigation system of the present invention for determining the street address position with use of building footprint information or latitude/longitude information of POI (point of interest).

FIG. 4 shows an example of simplified structure of the navigation system for determining the location of the specified street address number in accordance with the present invention. In this block diagram, the components in the structure of FIG. 3 which are directly involved in the operation of the present invention are shown for illustrating the essential structure of the present invention. The navigation apparatus of FIG. 4 includes the map storage medium 31 such as a DVD or hard disc, a map information memory 34, an address position controller 47, a buffer memory 49 and a monitor 50. The address position controller 47 can be a part of CPU 39 or a separate microprocessor.

The map storage medium 31 stores the map information encompassing, for example, all over the country. The map memory 34 extracts the map information from the map storage medium 31 repeatedly by an amount necessary for processing the map information such as a predetermined number of street segment data for traveling along the route to a destination. An image based on the map information is displayed on the monitor 50 during a route guidance process.

When an address of the destination is specified by a user, the address position controller 47 receives the address of the destination which includes a street address number. The address position controller 47 retrieves map information concerning a street segment through the map information memory 34 that includes the location of the specified address number therein. The address position controller 47 also checks the map information as to whether there is any polygon data or POI position data associated with the street segment. Namely, the address position controller 47 checks whether there is any large structure or buildings accompanied by polygon (footprint) data or any POI accompanied by latitude and longitude data.

If polygon data such as building footprint data or POI position data is associated with the street segment, the address position controller calculates a more accurate position of the specified address number on the street segment. This procedure is done by combining the absolute locations of the points on the building footprint or POIs with the absolute locations of the ends of the street segment and interpolating between two adjacent absolute locations. Thus, the navigation system is able to accurately determine the location of the street address number of the destination and guide the user to the destination.

The navigation system stores the relationship between the street address number and the actual position in the buffer memory 49 or other memory for use in the next travel. The updated position data can be stored in the map storage medium 31 if it is a rewritable memory such as a hard disc. Therefore, in the next travel to the same destination or a destination on the same street, the updated address position data is extracted from the buffer memory 49 (or hard disc 31), so that the position of the destination can be determined accurately without repeating the calculation process described above.

Figure 5:
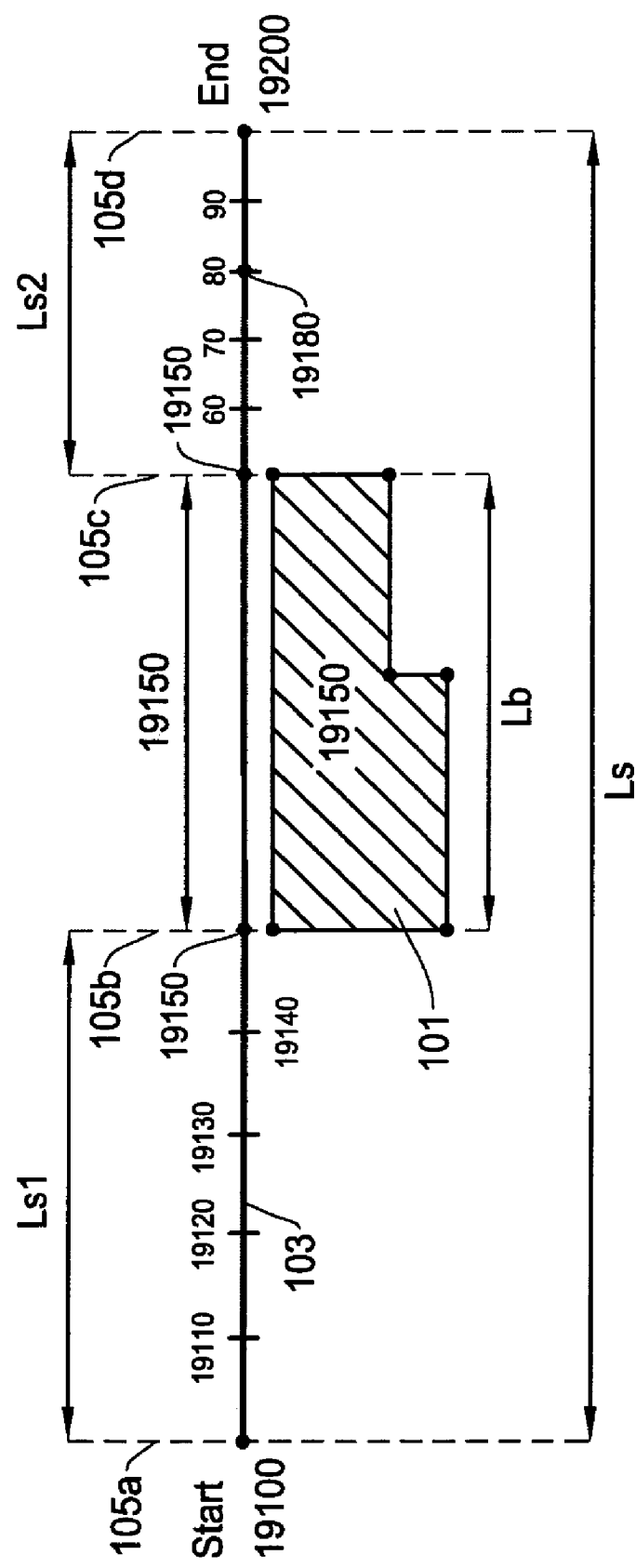
FIG. 5 is a schematic diagram showing an example of the present invention wherein the real location of the street address number is determined by interrelating the building footprint data with the street segment data.

FIG. 5 schematically shows an example of the present invention wherein the real location of the street address number is determined by interrelating the street between two or more absolute locations derived from the building footprint data and the road segment data. This example shows the case where a building has a single address which typically arises when such a building is owned and used by a single entity. Since the building footprint (polygon) data is available, the absolute locations (latitude/longitude information) of the polygon such as each corner of the polygon are known. As noted above, the absolute locations (latitude/longitude information) of the start and end points of the street segment are also known from the map data.

Suppose a street address number of "19180" of a particular street is specified by the user, the navigation system retrieves a street segment 103 which includes a location of the address number 19180. In this example, the street segment 103 starts by an address number 19100 (reference line 105a) and ends by an address number 19200 (reference line 105d), i.e., has a length Ls. The navigation system also checks whether there is any polygon data associated with this street segment 103. Suppose the map data includes polygon (footprint) data of a building 101 on the street segment 103, the navigation system retrieves the polygon data of the building 101.

In the example of FIG. 5, the address number of the building 101 is 19150. Thus, the navigation system determines that the address number at both ends (reference lines 105b and 105c) of the length Lb of the building 101 is 19150. The length Ls of the street segment 103 corresponding to the length of the building Lb is subtracted therefrom to interpolate the remaining portions (lengths Ls1 and Ls2) of the street segment 103.

Thus, the length Ls1 represents the range between the start point (address number 19100) to the reference line 105b (address number 19150) on the street segment 103. The length Ls2 represents the range between the line 105c (address number 19150) and the end point (address number 19200) on the street segment 103. The navigation system determines the locations of the address numbers on the street segment 103 by interpolating the length Ls1 and the length Ls2. In this example, the navigation system allocates the locations of the address numbers 19110, 19120, 19130 and 19140 on the length Ls1 by equally dividing the length Ls1 by five. Similarly, the navigation system allocates the locations of the address numbers 19160, 19170, 19180 and 19190 on the length Ls1 by equally dividing the length Ls2 by five. Therefore, the location of the street address number 19180 can be determined on the street segment 103 as shown in FIG. 5.

Figure 6:
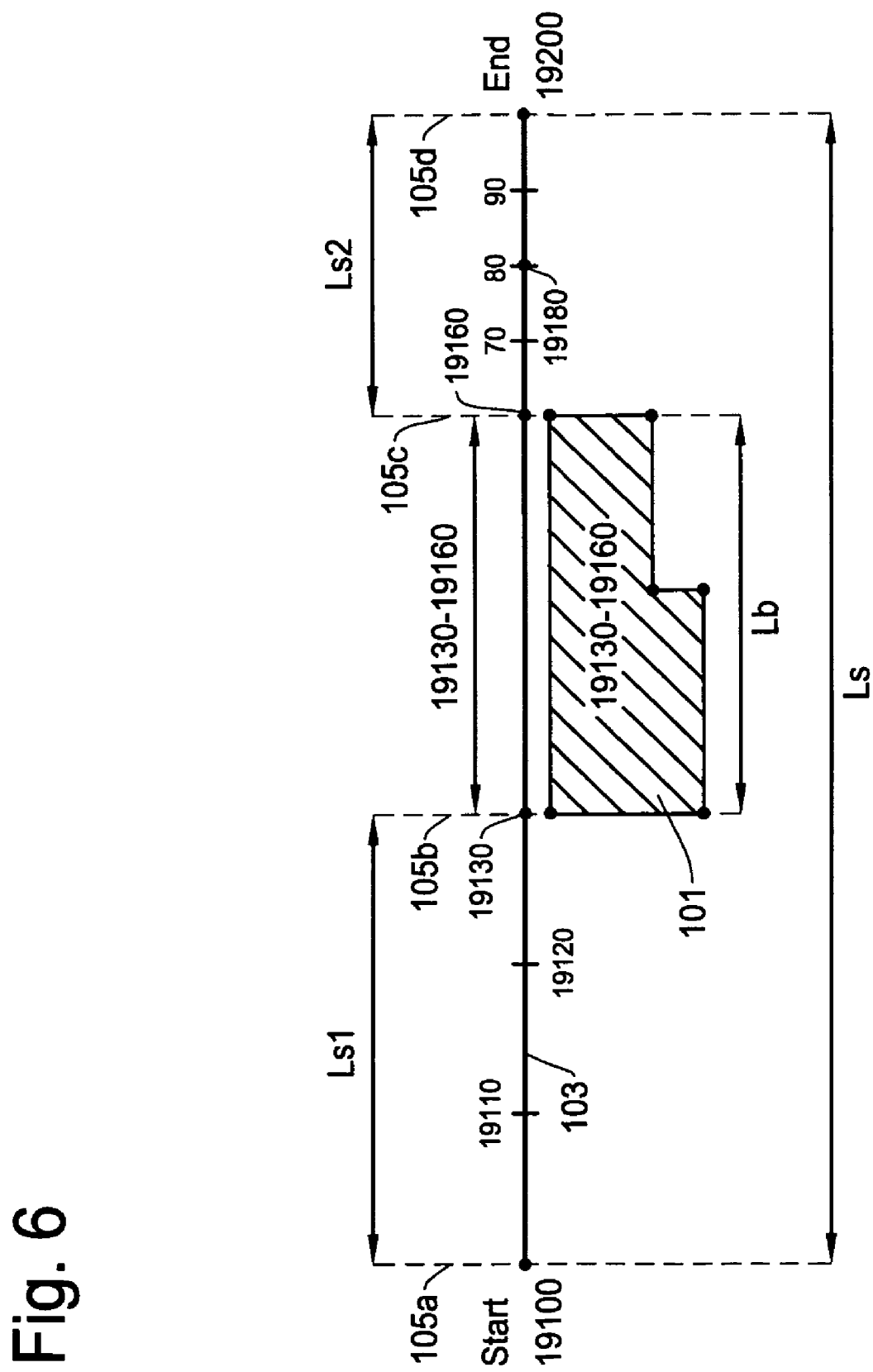
FIG. 6 is a schematic diagram showing another example of the present invention wherein the real location of the street address number is determined by interrelating the building footprint data with the street segment data.

FIG. 6 schematically shows another example of the present invention wherein the real location of the street address number is determined by interrelating between two or more absolute locations derived from the building footprint data and the road segment data. This example shows the case where a building is assigned with two or more address numbers which typically arises when such a building is divided into for several different entities. Since the building footprint (polygon) data is available, the absolute locations (latitude/longitude information) of the polygon such as each corner of the polygon are known. As noted above, the absolute locations (latitude/longitude information) of the start and end points of the street segment are also known from the map data.

Suppose an street address number of "19180" of a particular street is specified by the user, the navigation system retrieves a street segment 103 which includes a location of the street address number 19180. In this example, the street segment 103 starts by an address number 19100 (reference line 105a) and ends by an address number 19200 (reference line 105d), i.e., has a length Ls. The navigation system also checks whether there is any polygon data associated with this street segment 103. Suppose the map data includes polygon (footprint) data of a building 101 on the street segment 103, the navigation system retrieves the polygon data of the building 101.

In the example of FIG. 6, the address number of the building 101 extends between 19130 to 19160. Thus, the navigation system determines that the address number at the left end (reference line 105b) of the length Lb of the building 101 is 19130 and that the address number at the right end (reference line 105c) of the length Lb of the building 101 is 19160. The length Ls of the street segment 103 corresponding to the length of the building Lb is subtracted from the street segment 103 to interpolate the remaining portions of the street segment 103.

Thus, the length Ls1 represents the range between the start point (address number 19100) to the reference line 105b (address number 19130) on the street segment 103. The length Ls2 represents the range between the line 105c (address number 19160) and the end point (address number 19200) on the street segment 103. The navigation system determines the locations of the address numbers on the street segment 103 by interpolating the length Ls1 and the length Ls2. In this example, the navigation system allocates the locations of the address numbers 19110 and 19120 on the length Ls1 by equally dividing the length Ls1 by three. Similarly, the navigation system allocates the locations of the address numbers 19170, 19180 and 19190 on the length Ls1 by equally dividing the length Ls2 by four. Therefore, the location of the street address number 19180 can be determined on the street segment 103 as shown in FIG. 6.

Figure 2A:
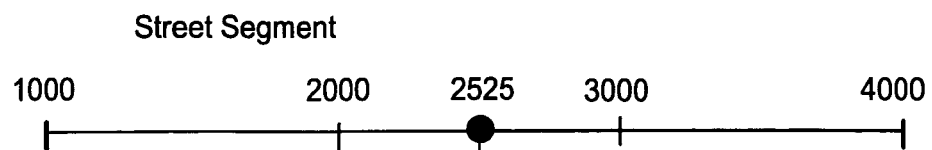
FIGS. 2A-2C are schematic diagram showing a difference between the address number allocation presumed by the navigation system based on map data and the actual address number allocation.
Figure 2B:
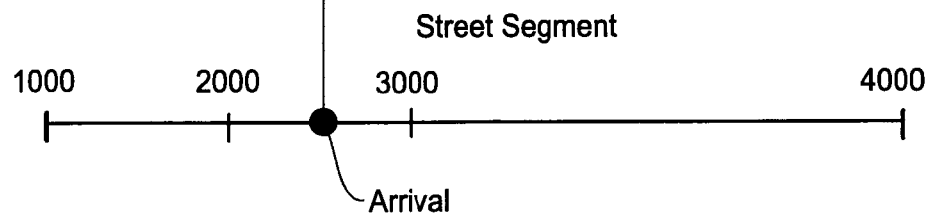
Figure 2C:
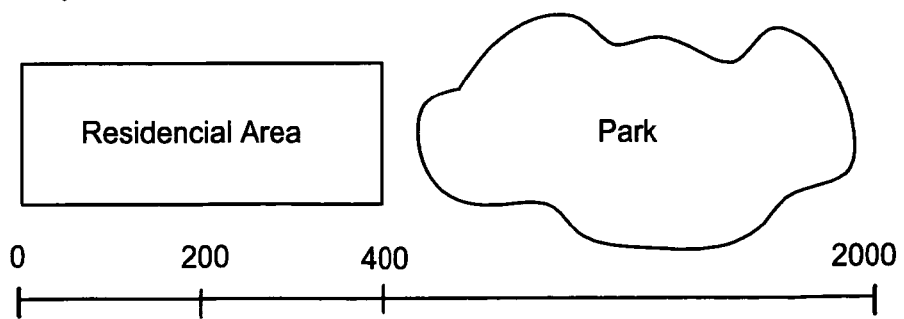
Figure 7A:
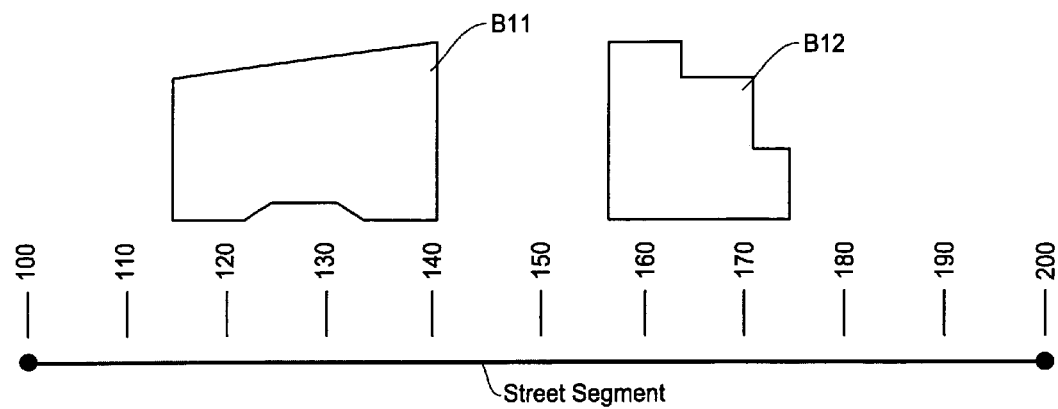
FIGS. 7A and 7B are schematic diagrams showing an effect of the present invention where
Figure 7B:
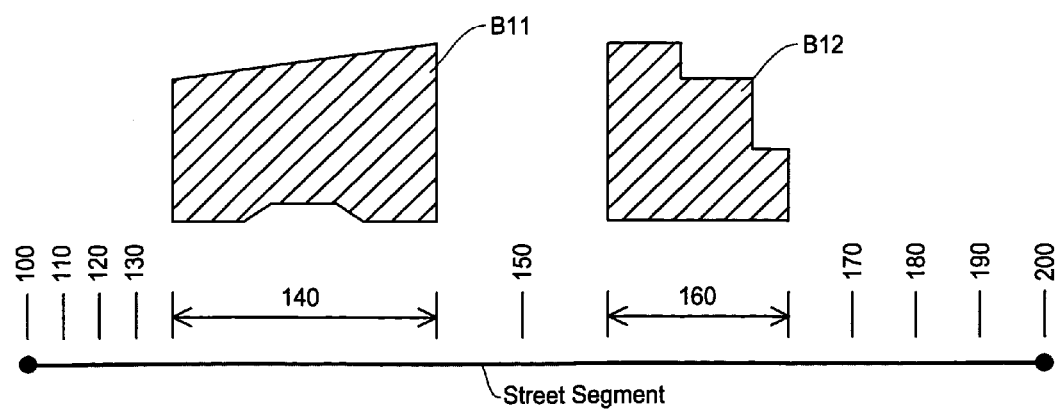

FIGS. 7A and 7B are schematic diagrams showing an effect of the present invention. FIG. 7A shows a case where building footprint information is not used for allocating address locations on a particular street, and FIG. 7B shows a case where the building footprint information is used for allocating address locations on the particular street. In FIG. 7A, a street segment having an address number 100 at one end and an address number 200 at another end is interpolated with a constant interval of distance without using information involving buildings B11 and B12. The buildings B11 and B12 have address numbers 140 and 160, respectively, on the street segment. As described with reference to FIGS. 2A-2C, this method of allocating the locations is inaccurate in many actual cases. For example, the location of the address number 130 comes at the front center of the building B11 although the building B11 has the address number 140.

In FIG. 7B, footprint information (polygon data) of the buildings B11 and B12 is utilized to determine the locations of the address numbers on the street segment. Because the address number of the building B11 is 140, the navigation system determines that the position on the street segment corresponding to the left end of the building B11 has the address number 140. Thus, the locations of the address numbers 110, 120 and 130 are determined by interpolating (dividing by four) between the absolute positions of the address numbers 100 and 140. As a result, the location of the address number 130 comes next to the building B11 which has the address number 140.

Similarly, because the address number of the building B12 is 160, the navigation system determines that the position on the street segment corresponding to the right end of the building B12 has the address number 160. Thus, the locations of the address numbers 170, 180 and 190 are determined by interpolating (dividing by four) between the positions of the address numbers 160 and 200. The location of the address number 150 is determined at the center of the right end (address number 140) of the building B11 and the left end (address number 160) of the building B12.

Figure 8:
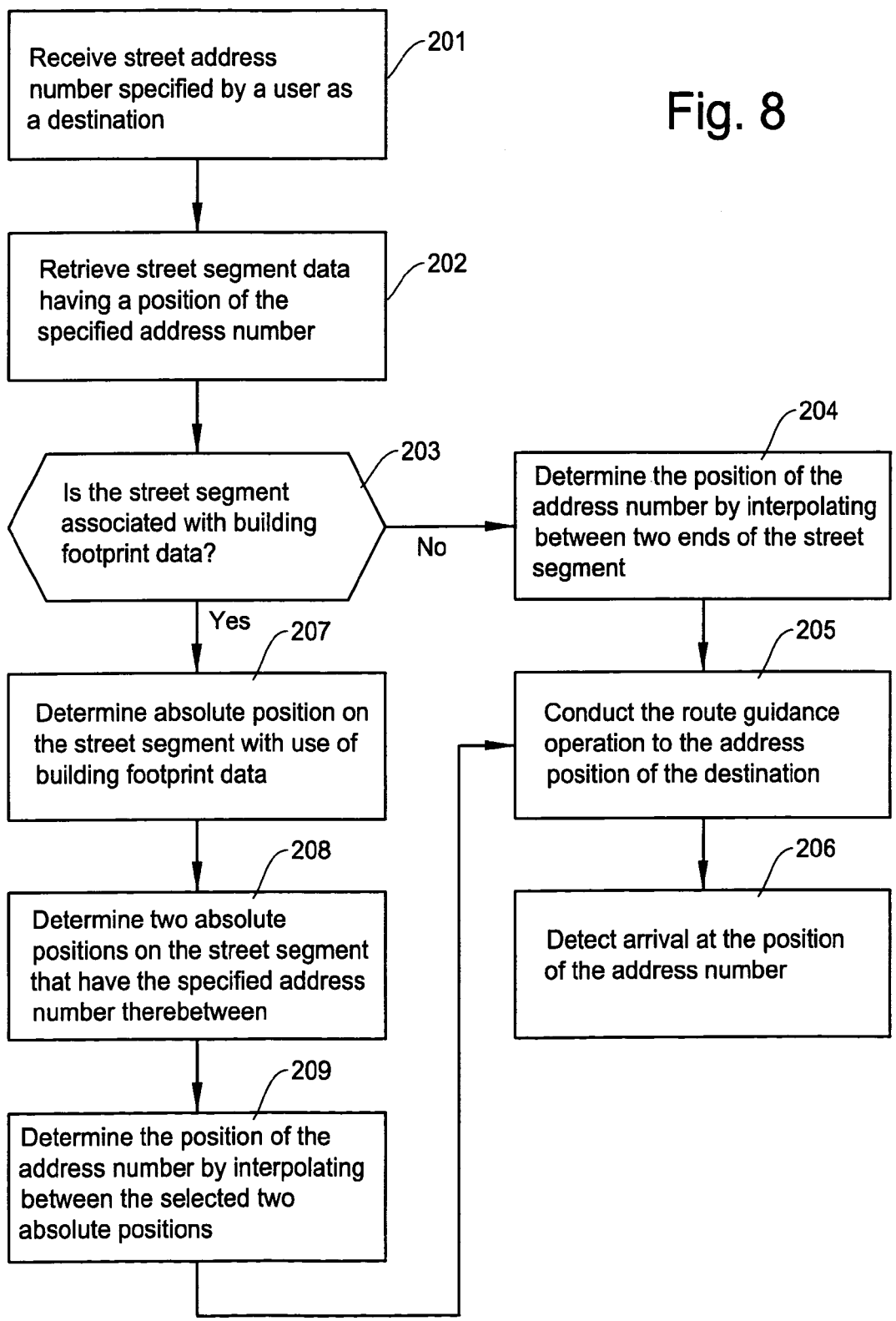
FIG. 8 is a flow chart showing an example of operation of the navigation method of the present invention for accurately determining the position indicated by the street address number with use of street segment data and building footprint information.

FIG. 8 is a flow chart showing an example of operation of the navigation method of the present invention for accurately determining the position indicated by the street address number with use of street segment data and building footprint information. The map data in the data storage medium 31 (FIG. 3) for the navigation system includes polygon data showing the two-dimensional shape, size and location of a structure such as footprint information of a building. In the present invention, if a street segment having a particular street address number is associated with polygon data, such as building footprint data, the navigation system will use the polygon data for determining the positions of the address numbers on the street segment.

In the first step 201, the navigation system receives a street address number of a destination specified by the user. At step 202, the navigation system retrieves data indicating a street segment which includes the specified street address number thereon from a map information storage (DVD 31 in FIGS. 3 and 4). The navigation system also checks whether there is any polygon data associated with this street segment at step 203. Typically, the polygon data for this purpose is building footprint data showing a shape, size and location of the building. Thus, the navigation system checks whether there is a building or other structure on the retrieved street segment and such a building is accompanied by the footprint information in the map data.

If there is no building footprint data available with respect to the street segment, the process moves to a conventional navigation procedure depicted by steps 204-206 and shown in FIGS. 1A-1H and 2A. Namely, in the step 204, the navigation system determines a position of the street address number by equally interpolating the street numbers between two ends of the street segment. As noted above, each end of the street segment is defined by latitude/longitude information, i.e., absolute position. In other words, the navigation system allocates the positions of the address numbers with constant interval between the two ends of the street segment. Then, the navigation system conducts the route guidance operation to the address position at step 205. When the vehicle comes within a predetermined range from the address position, the navigation system detects arrival at the destination in step 206, and process ends.

In the step 203, if building footprint data is available with respect to the street segment, the process moves to step 207 where the navigation system retrieves one or more absolute positions on the street segment based on the footprint data. As noted above, the building footprint data includes latitude/longitude data indicating absolute position of the corner points or other points of the building. Thus, by drawing a line from the appropriate point such as a corner point of the building that crosses perpendicularly with the street segment, the absolute position on the street segment can be obtained.

In step 208, the navigation system selects two absolute positions on the street segment in such a way that the specified address number resides between the two absolute position. In this procedure, it is preferable that the navigation system selects the two absolute positions closer to the specified address number for further improving the accuracy of position determination. Then, at step 209, the navigation system determines the position of the specified address number by interpolating the length between the two absolute positions with constant interval. Since the more accurate position of the destination is now determined, the process moves to the steps 205 and 206 for performing the route guidance operation.

Figure 9A:
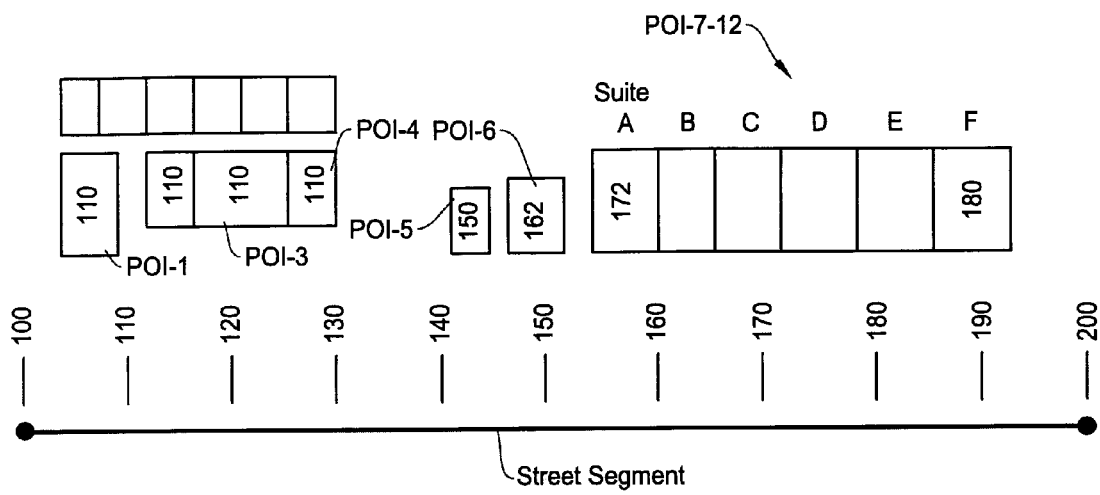
FIGS. 9A and 9B are schematic diagrams showing an effect of the present invention where
Figure 9B:
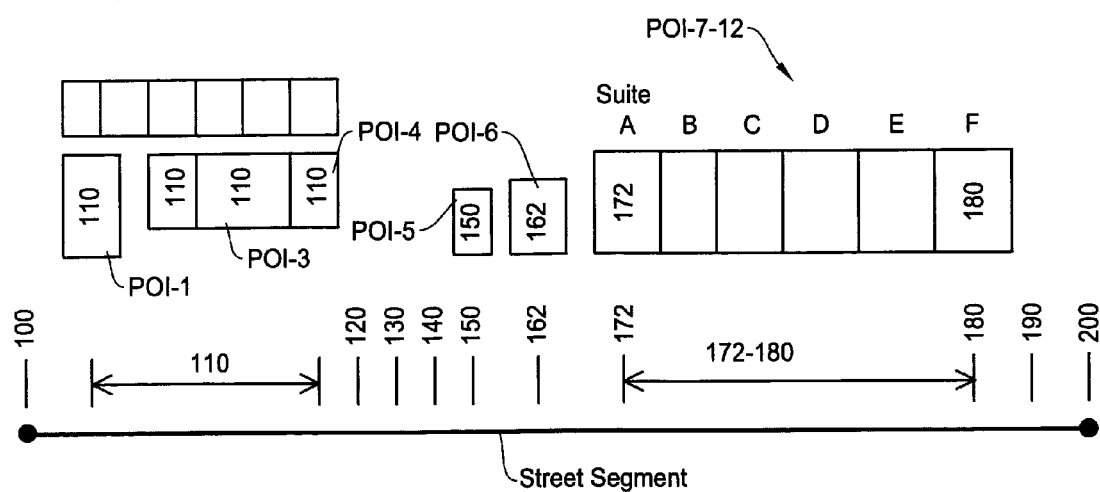

Another embodiment of the present invention is a method and apparatus for determining accurate location of the street address with use of POI position data. FIGS. 9A and 9B are schematic diagrams showing an effect of the present invention where FIG. 9A shows a case where latitude/longitude information of POIs is not used for allocating address locations on a particular street, and FIG. 9B shows a case where the latitude/longitude information of POIs is used for allocating address locations on the particular street. Although not always, the POI information in the recent map data includes latitude/longitude information of each POI to indicate an absolute position of the POI. This embodiment makes use of the latitude/longitude information of POIs to determine the locations on the street segment.

In FIGS. 9A and 9B, a group of POIs at the left side including POIs 1-4 is a large structure such as a shopping mall. In this example, the POIs 1-4 have the same address number. In contrast, a group of POIs at the right side including POIs 7-12 is another large structure such as an office compound building having suites A-F. In this example, the POIs 7-12 are assigned with address numbers different from one another. In FIG. 9A, a street segment having an address number 100 at one end and an address number 200 at another end is interpolated with a constant interval of distance without using information involving POIs 1-12 on the street segment. As described with reference to FIGS. 2A-2C and 7A, this method of allocating the locations is inaccurate in many actual cases.

In FIG. 9B, latitude/longitude information of the POIs is utilized to determine the locations of the address numbers on the street segment. Because the address number of the POIs 1-4 is 110, the navigation system determines that the position on the street segment corresponding to the position of POI-1 has the address number 110. Typically, the position on the street segment corresponding to the POI can be determined as a crossing point with a perpendicular line from the POI position. Further, the navigation system determines that the position on the street segment corresponding to the position of POI-4 also has the address number 110. In this example, another known location closer to the address numbers 120-140 is a location corresponding to POI-5 which has the address number 150. Thus, the positions of the address numbers 120, 130 and 140 are determined by interpolating (dividing by four) between the positions of the address numbers 110 and 150.

Similarly, because the POI-12 has the address number 180, the navigation system determines that the position on the street segment corresponding to the position of the POI-12 has the address number 180. Thus, the location of the address number 190 is determined by interpolating (dividing by two) between the positions of the address numbers 180 and 200. In this manner, the location of the address numbers on the street segment can be determined more accurately with use of the latitude/longitude information of the POIs, because the latitude/longitude information of the POI shows the absolute position of the POI.

Figure 10:
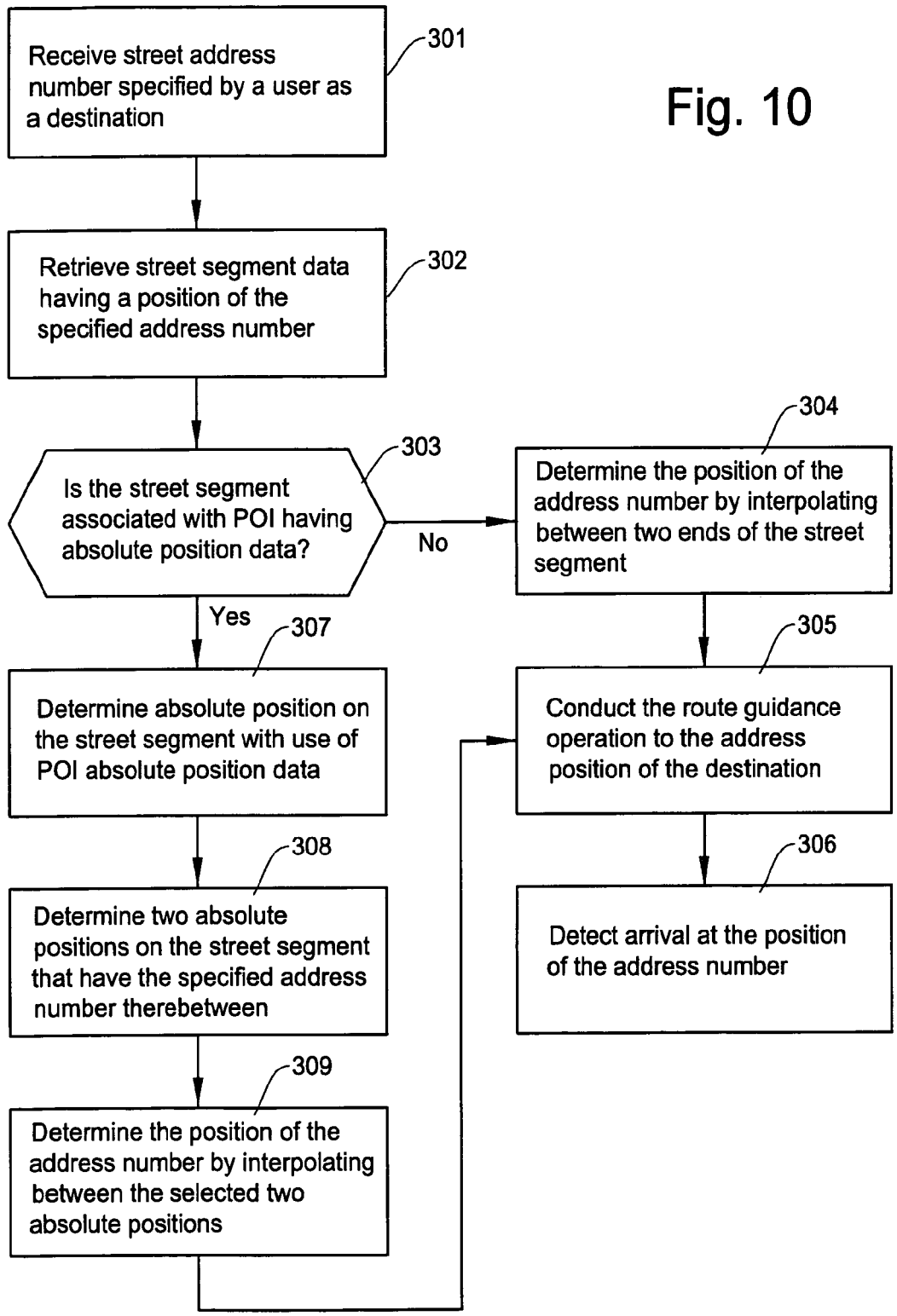
FIG. 10 is a flow chart showing an example of operation of the navigation method of the present invention for accurately determining the position indicated by the street address number with use of street segment data and latitude/longitude information of POI.

FIG. 10 is a flow chart showing an example of operation of the navigation method of the present invention for accurately determining the position indicated by the street address number with use of street segment data and latitude/longitude information of the POIs. The map data in the data storage medium 31 (FIG. 3) for the navigation system includes a large volume of POI data. The recent POI data is becoming to include latitude/longitude information, i.e., absolute location, of each POI. In the present invention, if a street segment having a particular street address number is associated with POI having the position (latitude/longitude) information, the navigation system will use the position information for determining the positions of the address numbers on the street segment.

In the first step 301, the navigation system receives a street address number of a destination specified by the user. At step 302, the navigation system retrieves data indicating a street segment which includes the specified street address number thereon from a map information storage (DVD 31 in FIGS. 3 and 4). The navigation system also checks map information as to whether there is any POI (point of interest) on the street segment accompanied by latitude/longitude information of POI at step 303. The latitude/longitude information of POI shows an absolute position of the POI.

If there is no latitude/longitude information of POI available with respect to the street segment, the process moves to a conventional navigation procedure depicted by steps 304-306 and shown in FIGS. 1A-1H and 2A. Namely, in the step 304, the navigation system determines a position of the street address number by equally interpolating the street numbers between two ends of the street segment. As noted above, each end of the street segment is defined by latitude/longitude information, i.e., absolute position. In other words, the navigation system allocates the positions of the address numbers with constant interval between the two ends of the street segment. Then, the navigation system conducts the route guidance operation to the address position of the destination at step 305. When the vehicle comes within a predetermined range from the address position, the navigation system detects arrival at the destination at step 306, and process ends.

In the step 303, if latitude/longitude information of POI is available with respect to the street segment, the process moves to step 307 where the navigation system determines one or more absolute positions on the street segment based on the latitude/longitude information of POIs. As noted above, the latitude/longitude information of POI indicates an absolute position of the POI. Thus, by drawing a line from the position of the POI that orthogonally crosses with the street segment, the absolute position on the street segment can be obtained.

In step 308, the navigation system selects two absolute positions on the street segment in such a way that the specified address number resides between the two absolute position. In this procedure, as noted above, it is preferable that the navigation system selects two absolute positions closer to the specified address number. Then, at step 309, the navigation system determines the position of the specified address number by interpolating the length between the two absolute positions with constant interval. Since the more accurate position of the destination is now determined, the process moves to the steps 305 and 306 for performing the route guidance operation.

Figure 11:
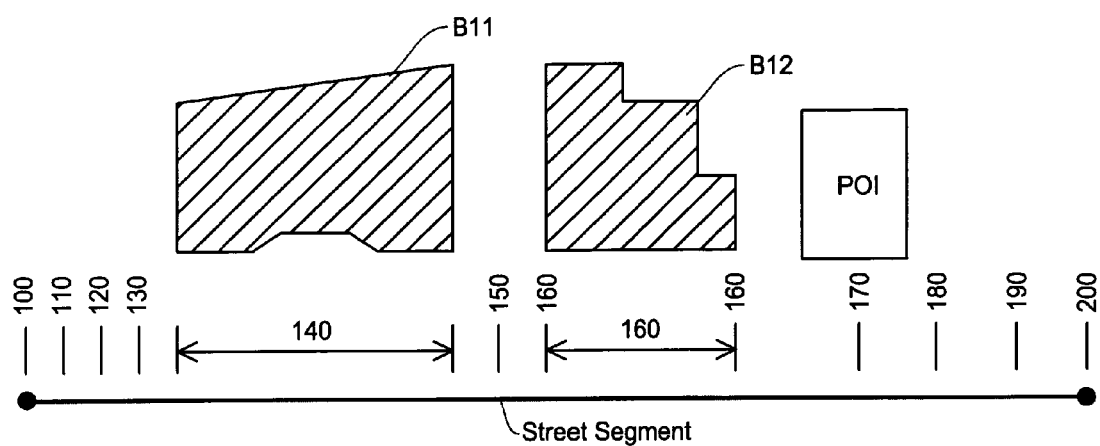
FIG. 11 is a schematic diagram showing an example of the present invention using both building footprint information and POI latitude/longitude information for allocating address locations on a particular street.

In the foregoing description, the case where the building footprint information is used and the case where the POI position information is used are explained separately. However, it is clear that, in accordance with the present invention, both the building footprint information and the POI position information can be used at the same time for determining accurate positions of the address numbers. Such an example is shown in FIG. 11 where the footprint information of the buildings B11 and B12 and latitude/longitude information of POI are used to allocate locations of the street address numbers.

As has been described above, according to the present invention, the navigation method and system improve accuracy in determining the location of the target address. The navigation method and system of the present invention is able to use building footprint information in combination with street segment data to accurately determining a position of an street address number. Further, the navigation method and system of the present invention is able to use latitude/longitude information of POI (point of interest) in the map data in combination with the street segment data to accurately determining a location of a street address number. Further, the navigation method and system of the present invention is able to use both the building footprint information and the latitude/longitude information of POI (point of interest) in the map data in combination with the street segment data to accurately defining a position of a selected destination.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for determining a position of a street address number, comprising the steps of:
   receiving a street address number of a destination specified by a user;
   retrieving data indicating a street segment which includes the specified street address number thereon from a map information storage;
   searching for supplemental data regarding a place associated with the retrieved street segment including information indicating absolute position of the place and retrieving the supplemental data from the map information storage;
   defining two or more absolute positions on the street segment with use of the supplemental data and the street segment data;
   selecting two absolute positions on the street segment that have the specified street address number therebetween; and
   determining a position of the specified address number by interpolating a length between the two selected absolute positions with a constant interval;
   said step of defining two or more absolute positions on the street segment includes a step of drawing a reference line perpendicular to the street segment from a selected point of the place showing the absolute position on the place where said reference line is an imaginary line drawn for determining said absolute position.

2. A navigation method as defined in claim 1, wherein said supplemental data is polygonal data of the place on the street segment which includes latitude/longitude information indicating a shape, size and location of the place.

3. A navigation method as defined in claim 1, wherein said supplemental data is footprint data of a building on the street segment which includes latitude/longitude information indicating a shape, size and location of the building.

4. A navigation method as defined in claim 3, wherein in said step of drawing a reference line perpendicular to the street segment, said selected point is a location showing the absolute position on the building.

5. A navigation method as defined in claim 1, wherein said supplemental data is position data of POI (point of interest) on the street segment which includes latitude/longitude information indicating an absolute position of the POI.

6. A navigation method as defined in claim 5, wherein in said step of drawing a reference line perpendicular to the street segment, said selected point is a location defined by latitude/longitude of the POI.

7. A navigation method as defined in claim 1, wherein said step of selecting two absolute positions on the street segment includes a step of selecting two absolute positions closer to the specified address number than other absolute positions.

8. A navigation method as defined in claim 1, further comprising a step of storing information regarding the determined position of the specified address number for future use for determining a position on the same street segment.

9. A navigation method as defined in claim 1, wherein said step of determining the position of the specified address number includes a step of determining positions of other address numbers on the street segment by interpolating a length between the two selected absolute positions with a constant interval and storing information regarding the determined positions for future use for determining a position on the same street segment.

10. A navigation system for determining a position of a street address number, comprising:
   means for receiving a street address number of a destination specified by a user;
   means for retrieving data indicating a street segment which includes the specified street address number thereon from a map information storage;
   means for searching for supplemental data regarding a place associated with the retrieved street segment including information indicating absolute position of the place and for retrieving the supplemental data from the map information storage;
   means for defining two or more absolute positions on the street segment with use of the supplemental data and the street segment data;
   means for selecting two absolute positions on the street segment that have the specified street address number therebetween; and
   means for determining a position of the specified address number by interpolating a length between the two selected absolute positions with a constant interval;
   said means for defining two or more absolute positions on the street segment includes means for drawing a reference line perpendicular to the street segment from a selected point of the place showing the absolute position on the place where said reference line is an imaginary line drawn for determining said absolute position.

11. A navigation system as defined in claim 10, wherein said supplemental data is polygonal data of the place on the street segment which includes latitude/longitude information indicating a shape, size and location of the place.

12. A navigation system as defined in claim 10, wherein said supplemental data is footprint data of a building on the street segment which includes latitude/longitude information indicating a shape, size and location of the building.

13. A navigation system as defined in claim 12, wherein in said means for drawing a reference line perpendicular to the street segment, said selected point is a location showing the absolute position on the building.

14. A navigation system as defined in claim 10, wherein said supplemental data is position data of POI (point of interest) on the street segment which includes latitude/longitude information indicating an absolute position of the POI.

15. A navigation system as defined in claim 14, wherein in said means for drawing a reference line perpendicular to the street segment, said selected point is a location defined by latitude/longitude of the POI.

16. A navigation system as defined in claim 10, wherein said means for selecting two absolute positions on the street segment includes means for selecting two absolute positions closer to the specified address number than other absolute positions.

17. A navigation system as defined in claim 10, further comprising means for storing information regarding the determined position of the specified address number for future use for determining a position on the same street segment.

18. A navigation system as defined in claim 10, wherein said means for determining the position of the specified address number includes means for determining positions of other address numbers on the street segment by interpolating a length between the two selected absolute positions with a constant interval and storing information regarding the determined positions for future use for determining a position on the same street segment.

* * * * *